United States Patent [19]
Kosyrev et al.

[11] 4,217,560
[45] Aug. 12, 1980

[54] GAS LASER

[76] Inventors: Felix K. Kosyrev, ulitsa Tsentralnaya, 14, kv. 27, Troitsk Moskovskoi oblasti; Valery A. Timofeev, ulitsa Zavodskaya, 9/1, kv. 14; Anatoly K. Pekh, ulitsa Fevralskaya, 6, kv. 6, both of Klimovsk Moskovskoi oblasti; Alexandr P. Leonov, Leninsky raion Mosrentgen, 19, kv. 37, Moskovskaya oblast, all of U.S.S.R.

[21] Appl. No.: 898,972

[22] Filed: Apr. 21, 1978

[30] Foreign Application Priority Data

Apr. 25, 1977 [SU] U.S.S.R. ............................... 2479581

[51] Int. Cl.$^2$ .................................................. H01S 3/02
[52] U.S. Cl. ............................ 331/94.5 D; 331/94.5 G
[58] Field of Search ..................... 331/94.5 G, 94.5 D, 331/94.5 T, 94.5 PE

[56] References Cited

U.S. PATENT DOCUMENTS 4,145,669   3/1979   Babcock ....................... 331/94.5 PE

OTHER PUBLICATIONS

Turgeon, "High Repetition Rate TEA Co$_2$ Laser", *IEEE J. of Quantum Electronics*, vol. Qe-7, No. 10, Oct. 1971, pp. 495–497.

*Primary Examiner*—James W. Davie
*Attorney, Agent, or Firm*—Steinberg & Blake

[57] ABSTRACT

According to the invention, the gas laser comprises a housing which accommodates two electrodes. One of the electrodes is sectional and has a ballast resistor connected to each section. One of the electrodes is so secured in the housing that it is possible to vary the spacing between the electrodes in the direction of the flow of a gas mixture passed through an active zone between the electrodes where the laser effect is produced. The invention provides for a maximum efficiency of the laser under different operating conditions.

2 Claims, 2 Drawing Figures

GAS LASER

FIELD OF THE INVENTION

The present invention relates to stimulated radiation devices and, more particularly, to gas lasers.

The invention can be used to advantage in different industries and is applicable to welding, cutting and heat treatment of different materials.

BACKGROUND OF THE INVENTION

There are many production processes in which laser technology proves to be superior to conventional techniques of working materials. The laser beam is particularly effective in special processes involving such factors as aggressive media and radiation. Production processes of this type call for gas lasers of ever increasing power, which makes it extremely important to maintain optimum operating conditions of such lasers.

There is known a gas laser comprising a housing which accommodates two electrodes. One of the electrodes is sectional and has a ballast resistor connected to each of its sections. A gas mixture is passed through an active zone between the electrodes, where the laser effect is produced. Both electrodes are rigidly fixed.

However, only one mode of operation can be optimized with the fixed arrangement of the electrodes.

The laser under review has other disadvantages. It is known, for instance, that the electric resistance of the gas mixture in the active zone, where the laser effect is produced, is not constant in the direction of motion of the gas mixture. In order to equalize the current flowing through the ballast resistors, such resistors are selected so that their resistance values increase as the sections of the sectional electrode become increasingly remote from the inlet through which the gas mixture is forced to the active zone wherein the laser effect is produced. This complication makes gas lasers hard to manufacture and operate.

Furthermore, any variation in the parameters of the gas mixture, such as the composition or pressure, cuases a change in the electric characteristics of the active zone where the laser effect is produced. This affects the uniformity of current distribution among the individual sections of the sectional electrode, which, in turn, reduces the efficiency of the laser and in some cases is the cause of an arc discharge.

SUMMARY OF THE INVENTION

It is an object of the present invention to ensure a maximum efficiency of gas lasers in different operating conditions.

It is another object of the invention to provide a gas laser featuring a maximum efficiency in different operating conditions.

It is still another object of the invention to increase the gas laser output.

It is yet another object of the invention to reduce resistance values of the ballast resistors.

The foregoing objects are attained by providing a gas laser comprising a housing which accommodates two electrodes, whereof one is sectional and has a ballast resistor connected to each of its sections, the laser effect being produced in an active zone between the electrodes, through which a gas mixture is passed, the gas laser being characterized, according to the invention, in that one of the electrodes is so secured in the housing that it is possible to vary the spacing between the electrodes in the direction of the gas mixture flow.

BRIEF DESCRIPTION OF THE ACCOMPANYING DRAWINGS

Other objects and advantages of the present invention will become more apparent from the following detailed description of a preferred embodiment thereof, taken in conjunction with the accompanying drawings, wherein.

DETAILED DESCRIPTION OF THE INVENTION

Figure 1:
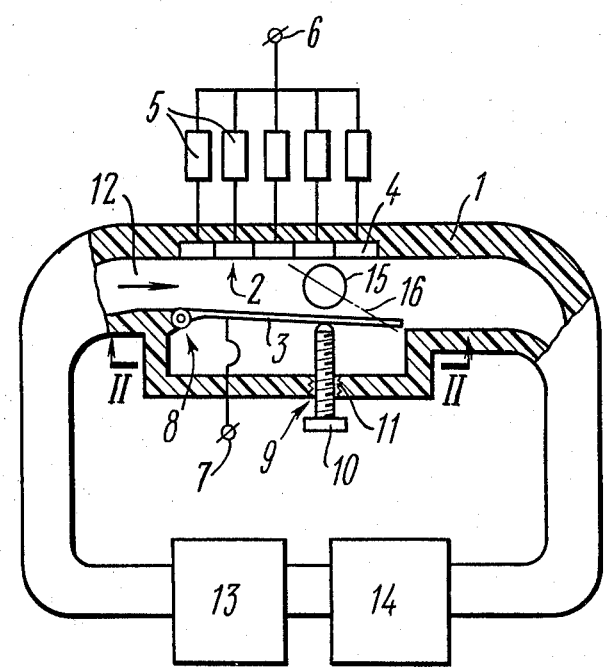
FIG. 1 is a cut-away view of a gas laser in accordance with the invention.
Figure 2:
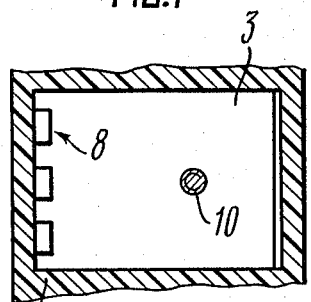
FIG. 2 is a section taken on line II-II of FIG. 1.

The gas laser according to the invention comprises a housing 1 (FIG. 1) of an electrically insulating material, which accommodates two electrodes 2 and 3. One of these is a section electrode, whereas the other is a plate-type electrode. The electrode 2 is the cathode, and the electrode 3 is the anode. Each section 4 of the electrode 2 is connected to one of the leads of a ballast resistor 5 having its second lead connected to a first input terminal 6. A second input terminal 7 is connected to the electrode 3. The latter is secured in the housing 1 by means of an articulated joint 8 (FIGS. 1 and 2) so that it is possible to vary the spacing between the electrodes 2 and 3 in the direction of the gas mixture flow. The gas laser of this invention is provided with a means 9 for adjusting the deflection of the electrode 3. The means 9 is a screw pair comprising an adjusting screw 10 and a threaded hole 11 provided in the housing 1. The screw 10 is driven through the hole 11 to be in contact with the electrode 3. The laser effect is produced in an active zone 12 between the electrodes 2 and 3 (FIG. 1), through which the gas mixture is passed. The housing 1 further accommodates a gas mixture pumping means 13 and a heat exchanger 14 for cooling the gas mixture. The means 13 and heat exchanger 14 communicate with each other and with the active zone 12. The gas laser also includes a cavity 15 whose optical axis 16 traverses the zone 12.

The gas laser according to the invention operates as follows.

A high-voltage source (not shown) is connected to the input terminals 6 and 7. The means 13 forces a gas mixture flow at a predetermined velocity through the active zone 12 where the laser effect is produced. The direction of the gas mixture flow is indicated by the arrow.

The high voltage applied to the electrodes 2 and 3 produces a discharge possessing prescribed parameters in the active zone 12; as a result, there is a flow of current through the ballast resistors 5. A change in the parameters of the gas mixture, such as the composition or pressure, alters the electric characteristics of the active zone 12 and effects the uniformity of the distribution of currents flowing through the sections 4 of the electrode 2 and the ballast resistors 5.

The means 9 for adjusting the deflection of th electrode 3 secured in the housing 1 by means of the articulated joint 8 ensures a maximum efficiency of the laser in different operating conditions. This is done with the aid of the adjusting screw 10 which is in direct contact with the electrode 3. The screw 10 brings the electrode 3 to a position which compensates for the changes in the electric characteristics of the active zone 12 and restores the uniformity of the distribution of currents flowing through the ballast resistors 5.

The invention eliminates the necessity of imposing stringent accuracy requirements upon the selection of ballast resistors, which makes it easier to manufacture and operate gas lasers.

What is claimed is:

1. A gas laser comprising:

a housing with a threaded hole;

a gas mixture passed through said housing;

a first electrode composed of a plurality of sections and accommodated in said housing;

a group of ballast resistors;

each ballast resistor of said group of ballast resistors having a first lead and a second lead and connected with its first lead to one of the sections of said plurality of sections of said first electrode;

said second leads of said ballast resistors of said group of ballast resistors being interconnected and forming a first input of said gas laser;

a second electrode accommodated in said housing, opposite said first electrode on the side of said plurality of sections;

one of said first and second electrodes being secured in said housing by means of an articulated joint which makes it possible to vary the spacing between said first and second electrodes in the direction of said gas mixture flow, while the laser is provided with a means to adjust the deflection of the electrode which is secured in said housing by means of said articulated joint;

an active zone, where the laser effect is produced, located between said first and second electrodes, wherethrough said gas mixture is passed;

a cavity having an optical axis traversing said active zone where the laser effect is produced;

a gas mixture pumping means accommodated in said housing, having an inlet and an outlet and communicating with said outlet with said active zone where the laser effect is produced; and a heat exchanger accommodated in said housing, having an inlet and an outlet and communicating with said inlet with said active zone where the laser effect is produced, and with said outlet with said gas mixture pumping means.

2. A gas laser as claimed in claim 1, wherein said means for adjusting the deflection of the electrode secured in said housing by means of said articulated joint is a screw pair comprising:

said threaded hole provided in said housing;

an adjusting screw driven through said threaded hole in said housing to be in contact with said electrode which is secured in said housing by means of said articulated joint.

* * * * *